United States Patent [19]

Mengel

[11] 4,111,569
[45] Sep. 5, 1978

[54] SHELL AND SHAFT SUBASSEMBLY

[75] Inventor: William Rudolph Mengel, Easthampton, Mass.

[73] Assignee: Magnat Corp., Easthampton, Mass.

[21] Appl. No.: 806,444

[22] Filed: Jun. 14, 1977

[51] Int. Cl.² ............................................. F16C 13/00
[52] U.S. Cl. ...................................... 403/5; 279/2 A; 403/366; 29/113 R
[58] Field of Search ...................... 403/5, 31, 366, 372; 279/2, 2 A, 4; 29/113 R; 242/72 B

[56] References Cited

U.S. PATENT DOCUMENTS

| 3,378,902 | 4/1968 | Hoexter | 403/31 X |
| 3,486,776 | 12/1969 | Le Baron | 403/5 |

FOREIGN PATENT DOCUMENTS 569,773   11/1957   Italy ............................................. 403/5

Primary Examiner—Andrew V. Kundrat
Attorney, Agent, or Firm—Ross, Ross & Flavin

[57] ABSTRACT

A shell and shaft subassembly for holding a shell or roller fast in a non-rotating relationship with respect to a supporting shaft, the shell being secured in its non-rotating relation to the shaft by a subassembly comprising a complemental pair of concentrically-arranged annular sleeves or tubes defining in the space therebetween, cooperantly with spaced opposite end rings, a closed annular chamber. The sleeve walls are each provided with an endless, continuous, serpentine or sinuous groove which meanders from end to end, the groove or sinuosity on the inner sleeve being disposed exteriorly of the tube, and the groove or sinuosity on the outer sleeve being disposed interiorly of the tube. With the grooves facing each other within the annular chamber. Sinuosity defines an endless or continuous thin walled or membranous area winding sinuously with respect to a periphery of each sleeve. When a pressurized fluid or air is introduced to the annular chamber, the thin or membranous areas of the walls of the two sleeves are expanded radially outwardly in opposite directions, the inner sleeve expanding inwardly toward the shaft periphery and the outer sleeve expanding outwardly toward the shell inner wall, with the expansion creating a frictional gripping engagement of each sleeve with its respective adjacent component.

3 Claims, 5 Drawing Figures

SHELL AND SHAFT SUBASSEMBLY

This invention relates to a subassembly disposable between a shell or roller and a shaft for holding the shell fast in a non-rotating relationship with respect to the supporting shaft. The shell is secured in its non-rotating relation to the shaft by a subassembly comprised of a complemental pair of concentrically-arranged annular sleeves or tubes which define, in the space therebetween, and cooperantly with spaced opposite end rings, a closed annular chamber. The sleeve walls are each provided with an endless, continuous, serpentine or sinuous groove which wanders back and forth from end to end along a wall of the sleeve. In the case of the inner sleeve, the sinuosity is disposed exteriorly of the tube. In the case of the outer sleeve, the sinuosity is disposed interiorly of the tube. The sinuosities each extend substantially in circular planes, are concentric as to each other, are facing each other within the annular chamber. They each define an endless or continuous thin walled area in each sleeve. When a pressurized fluid or air is introduced to the annular chamber, the walls of the two sleeves are expanded radially outwardly in opposite directions in the sinuously extending thin walled areas, the inner sleeve expanding inwardly toward the shaft periphery and the outer sleeve expanding outwardly toward the shell inner wall, with the expansion creating a frictional gripping engagement of each sleeve with its respective adjacent component.

One primary object is to provide a pneumatic or hydraulic expansion system for disposition between a spindle or core shaft and a core or shell. By its use, it is possible to mount a core or shell upon a spindle or shaft and to remove it therefrom quite rapidly and without the use of collars and set screws, as well as to provide a lengthwise adjustment of a shell or core along a shaft or spindle without difficulty since the mechanism will hold the shell or core in a wide range of positions.

Rollers or cylinders of the type envisioned are used on presses of various kinds including printing presses wherein a drive is imparted to the shaft which is usually journalled in a frame. The desideratum is normally to secure the roller to the shaft with the roller periphery being in precise concentricity with the shaft axis.

As is known, in the case of such rollers, they must be changed periodically. Desirably, for the ready mounting of a roller on different shafts at different times and removal from and mounting upon any given shaft at any given time, a minimum of down time, must be achieved.

In the case of a roller, the devices may conceivably be employed at each end thereof so as to be interengaged with each of the roller end walls.

The serpentine chamber will have an opening or openings in an outside ring adjacent the roll axis for receiving a fluid and having a closure cap to seal the same and a means for generating a sufficient pressure therewithin as to expand the walls of the half parts into firm engagement with the shaft or roller and with the outer shell.

Figure 4:
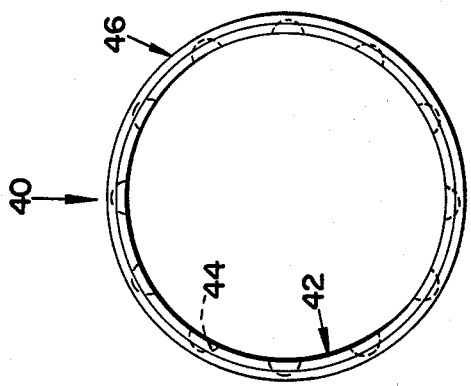
FIG. 4 is an end view of the outer sleeve of the mechanism.
Figure 5:
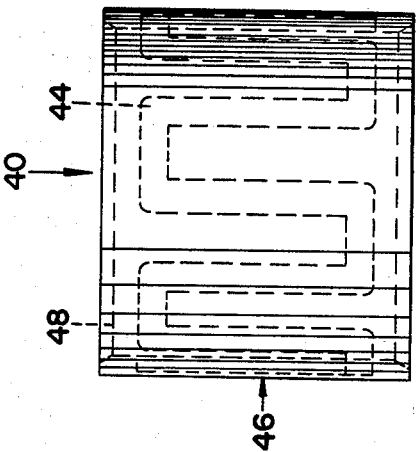
FIG. 5 is a side elevational view of the FIG. 4 inner sleeve.
Figure 1:
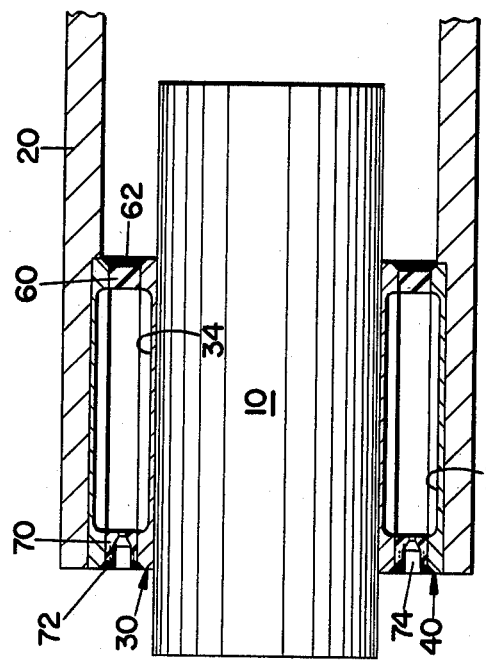
FIG. 1 is a sectional view through the interengaged outer shell and inner shaft with the demountable mechanism being disposed operatively therebetween as at one end of a roller.
Figure 2:
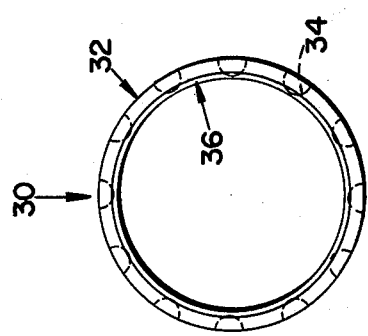
FIG. 2 is an end view of the inner sleeve of the mechanism.
Figure 3:
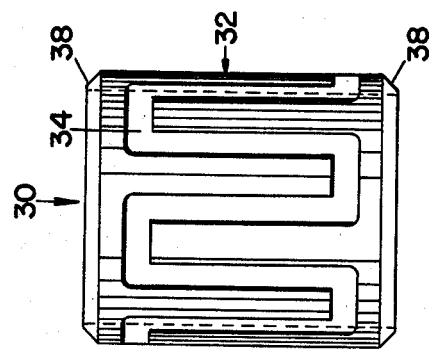
FIG. 3 is a side elevational view of the FIG. 2 inner sleeve.

A stub shaft is shown at 10 and same may comprise a full shaft of such as a roller or a plug such as is represented here.

Relative thereto, it will be understood to be desired to interengage the shaft with a shell 20 in a manner such that the shell will have a non-rotating relation with the shaft and the shell periphery will be concentric with the shaft axis.

To this end, an inner sleeve 30 in the form of a tube or annular ring is employed which will have an ID slightly in excess of the OD of the shaft so as to be sleevable thereupon.

The outside surface 32 of inner sleeve 30 is provided with an endless serpentine groove 34, same being provided by such as a ball mill cutting into the outside surface of the tube or ring.

The inside surface 36 is smooth for embracement with shaft 10.

If desired, the outside end edges of the tube or ring may be chamferred as at 38.

An outer sleeve 40, likewise in the form of a tube or annular ring, is employed which will have an OD slightly less than the ID of the shell so as to be sleevable therewithin.

The inside surface 42 of outer sleeve 40 is provided with an endless serpentine groove 44 of a configuration matching groove 34 of inner sleeve 30.

The outside surface 46 is smooth for embracement with the inner wall of shell 20.

If desired, the inside end edges may be chamferred as at 48.

The two sleeves may be assembled as to each other by means of an inside ring 60 which will be disposed between the inside edges of the confronting sleeves, which inside ring functions as a spacer and may be welded to each sleeve as shown at 62.

They may be further spaced as to each other by means of an outside ring 70 and welded to each sleeve as by welding 72.

Outside ring 70 may be suitably tapped as at 74 to allow for introduction of a pressure means so that the defined annular chamber may be pressurized.

The assembly of sleeves may be then introduced to the shaft and shell so as to be interposed therebetween.

Pressurization of the annular chamber will allow the expansion of the thin wall of each of the grooves in the case of each sleeve.

The walls of the two sleeves are expanded radially outwardly in opposite directions in the sinuously extending thin walled areas. The inner sleeve expands inwardly toward the shaft periphery; the outer sleeve expands outwardly toward the shell inner wall. The expansion creates a frictional gripping engagement of each sleeve with its respective adjacent component.

In this way, I provide a means whereby the mechanism can be expanded at a great plurality of points along the shaft and shell peripheries after the device has been adjustably positioned in a desired manner.

By the use of appropriate valving, I can readily inflate or deflate my annular chamber at will.

The shell will slip over the spindle without obstruction when the chambers are deflated but will be held fast by the devices when inflated.

While there have been described herein what are at present considered preferred embodiments of the invention, it will be obvious to those skilled in the art that many modifications and changes may be made therein without department from the essence of the invention. It is therefore to be understood that the exemplary embodiments are illustrative and not restrictive of the invention,, the scope of which is defined in the appended claims, and that all modifications that come within the meaning and range of equivalency of the claim are intended to be included therein.

I claim:

1. The combination with a shell or roller and shafting therefor, of securing means for securing the shell or roller in non-rotative relation on the shafting with the shell or roller periphery being concentric with the shafting axis, the securing means comprising:

a pair of concentrically-arranged annular inner and outer sleeves, a pair of end rings secured to and spacing the inner and outer sleeves at their opposite ends, the inner and outer sleeves and end rings cooperatively defining a closed annular chamber, an endless sinuous groove in a wall of each sleeve, the groove in the inner sleeve being disposed exteriorly of the sleeve, the groove in the outer sleeve being disposed interiorly of the sleeve, and means for introducing a pressurized medium to the annular chamber for expanding the walls of the two sleeves radially outwardly in opposite directions in the sinuously extending thin walled areas, the inner sleeve expanding inwardly toward the shaft periphery and the outer sleeve expanding outwardly toward the shell inner wall, with the expansion creating a frictional gripping engagement of each sleeve with its respective adjacent component.

2. The combination with a shell or roller and shafting therefor, of securing means for securing the shell or roller in non-rotative relation on the shafting with the shell or roller periphery being concentric with the shafting axis, the securing means comprising:

a pair of concentrically-arranged annular inner and outer sleeves, a pair of end rings secured to and spacing the inner and outer sleeves at their opposite ends, the inner and outer sleeves and end rings cooperatively defining a closed annular chamber, an endless sinuous circumferential groove in a wall of each sleeve defining a continuous membranous area, the groove in the inner sleeve being disposed exteriorly of the sleeve, the groove in the outer sleeve being disposed interiorly of the sleeve, and means for inflating and deflating the annular chamber for expanding the walls of the two sleeves radially outwardly in opposite directions in the sinuously extending membranous areas so that the areas project beyond the outer surface of the respective sleeve when inflated, the inner sleeve expanding inwardly toward the shaft periphery and the outer sleeve expanding outwardly toward the shell inner wall, with the expansion creating a frictional gripping engagement of each sleeve with its respective adjacent component.

3. A flexure compensating mechanism for disposition between a shell or roller and the shafting therefor for securing the components in non-rotative relation with respect to each other, a mechanism for disposition at each side edge of the shell comprising:

a pair of spaced concentrically-arranged annular inner and outer sleeves, a pair of end rings secured between and to the inner and outer sleeves at their opposite ends and cooperating with the sleeve defining a closed annular chamber, an endless sinuous groove in the wall of each sleeve and defining a continuous thin membraneous area in the sleeve wall, the groove on the inner sleeve being disposed exteriorly of the sleeve, the groove on the outer sleeve being disposed interiorly of the sleeve, and means for introducing a pressurized medium to the annular chamber for expanding the membranous areas of the two sleeves radially outwardly in opposite directions, the inner sleeve expanding inwardly toward the shaft periphery and the outer sleeve expanding outwardly toward the shell inner wall, with the expansion creating a frictional gripping engagement of each sleeve with its respective adjacent component.

* * * * *